Fig. 2

United States Patent Office 3,325,840
Patented June 20, 1967

3,325,840
BACKPART MOLDING MACHINES
George C. Barton and Peter L. Stapleton, Leicester, England, assignors to United Shoe Machinery Corporation, Flemington, N.J., a corporation of New Jersey
Filed June 24, 1964, Ser. No. 377,692
Claims priority, application Great Britain, July 3, 1963, 26,318/63
15 Claims. (Cl. 12—52.5)

This invention relates to machines for shaping shoe uppers and is herein illustrated in its application to machines for shaping or molding back parts of shoe uppers upon forms. A machine of this type is disclosed, for example, in United States Letters Patent No. 3,096,531, grented July 9, 1963, on an application filed in the name of Adelbert W. Rockwell, Jr.

Machines of this type are commonly provided with instrumentalities for tensioning the back part of a shoe upper upon a form which may be a shoe last or alternatively a heel form incorporated in the machine. While the shoe upper is held under tension on the form, means such as a heel band or pad engages the back part of the upper and shapes or molds it to the contour of the heel form. Machines such, for example, as that disclosed in the Rockwell patent above referred to, include in their organization means for applying heat and moisture to the back part of a shoe upper to condition it for the upper shaping operation.

The production obtainable in a machine of this type depends upon the arrangement of the operating instrumentalities to facilitate the presentation of a shoe upper first to the upper conditioning means and thereafter to the form on which the upper is mounted for the shaping or molding operation. It is an object of the present invention to provide a machine organization in which the time required to present a shoe upper to the operating instrumentalities is reduced to a minimum thereby increasing the output of the machine.

It is a further object of the invention to provide a machine in which the operating parts are relatively few and simple in design thus achieving a low cost machine without sacrifice of efficiency in operation or quality in the work performed.

With the above and other objects in view as will hereinafter appear, the present invention in one aspect thereof contemplates the provision in an upper shaping machine of a jack mounted for movement between a loading station and an upper shaping station and having mounted thereon a form for supporting a shoe upper for an upper shaping or molding operation. The construction of the jack and its arrangement in the machine facilitates the loading of a shoe upper on the upper supporting form and enables the operator readily to view the upper on the form and conveniently to make any necessary adjustments in the position of the upper. The shaping operation is performed by a band mounted in an upper shaping station and means is provided for advancing the jack from the loading station to the upper shaping station thereby to thrust the upper on the form into the embrace of the heel band. The means for applying heat and moisture to the upper includes a turret mounted for stepwise rotation to advance a shoe upper thereon to an from a loading station located in close proximity to the jack. The turret is provided with work supporting means which facilitates the mounting of a shoe upper for the upper conditioning operation and requires no time consuming manual operations. The cycle of the turret operation is sufficient to afford enough time for the upper conditioning operation. Means is provided for advancing the turret one step concomitantly with the advancement of the jack from the loading station to the upper shaping station.

The mounting of the upper on the form is facilitated by a gage member carried by the jack and arranged to determine the position of a shoe upper on the form. In order to provide clearance for the operation of the upper shaping band, the gage member is retracted from its gagging position by means operated by movement of the jack from the loading station to the upper shaping station.

For tensioning a shoe upper on the form the present invention provides a pair of gripper jaws mounted on a carrier which in turn is mounted on the jack. An actuator mounted on the jack operates first to close the gripper jaws and thereafter to move the carrier in a direction to cause the gripper jaws to apply tension to the upper.

In order to provide for relative advancement of the jack and the heel band heightwise of a shoe upper mounted on the form the heel band is mounted on a carrier which itself is mounted in a suitable fixture for movement heightwise of the upper, appropriate means being provided for effecting such movement of the carrier. For wiping the bottom margin at the back line of the upper upon the heel form thereby to form a crease in the upper facilitating the subsequent location of the upper for a heel and lasting operation, a resilient wiper element is fixed to the heel band carrier so as to be operable during movement of the form from the loading station to the upper shaping station to perform a wiping operation upon the bottom margin of the upper.

In order to insure a local shaping operation at the back line of the upper prior to the application of pressure by the heel band upon opposite sides of the heel portion of the upper the heel band is supported upon members mounted on the heel band carrier and connected to the heel band at opposite sides thereof, suitable means being provided for causing the supporting members to hold the heel band outspread while a thrust member acting against the central portion of the band yieldingly resists upward movement of the band by the upward thrust of the heel form so that a shoe upper on the heel form receives local pressure by the heel band along the back line of the upper. Continued upward movement of the heel form after the initial application of upper shaping pressure at the back line causes opposite side portions of the band to be pressed against opposite sides of the heel end portion of the upper to complete the upper shaping operation.

The turret organization provided by the present invention for treating a shoe upper with heat and moisture preparatory to an upper shaping operation has a plurality of upper supporting members offset outwardly therefrom and a plurality of apertures in registration with the upper supporting members, a fixed shroud being arranged partially to surround the turret so as to prevent undue dissipation of heat and moisture during the upper treating operation. Suitable means is provided for effecting stepwise rotation of the turret and for producing heat and water vapor within the turret. The heating means includes a first reflector for reflecting upwardly heat produced by a heating unit and a second reflector for reflecting heat outwardly through the apertures in the turret and against uppers mounted on the supporting members.

These and other features of the invention will now be described with reference to the accompanying drawings and pointed out in the appended claims.

Figure 1:
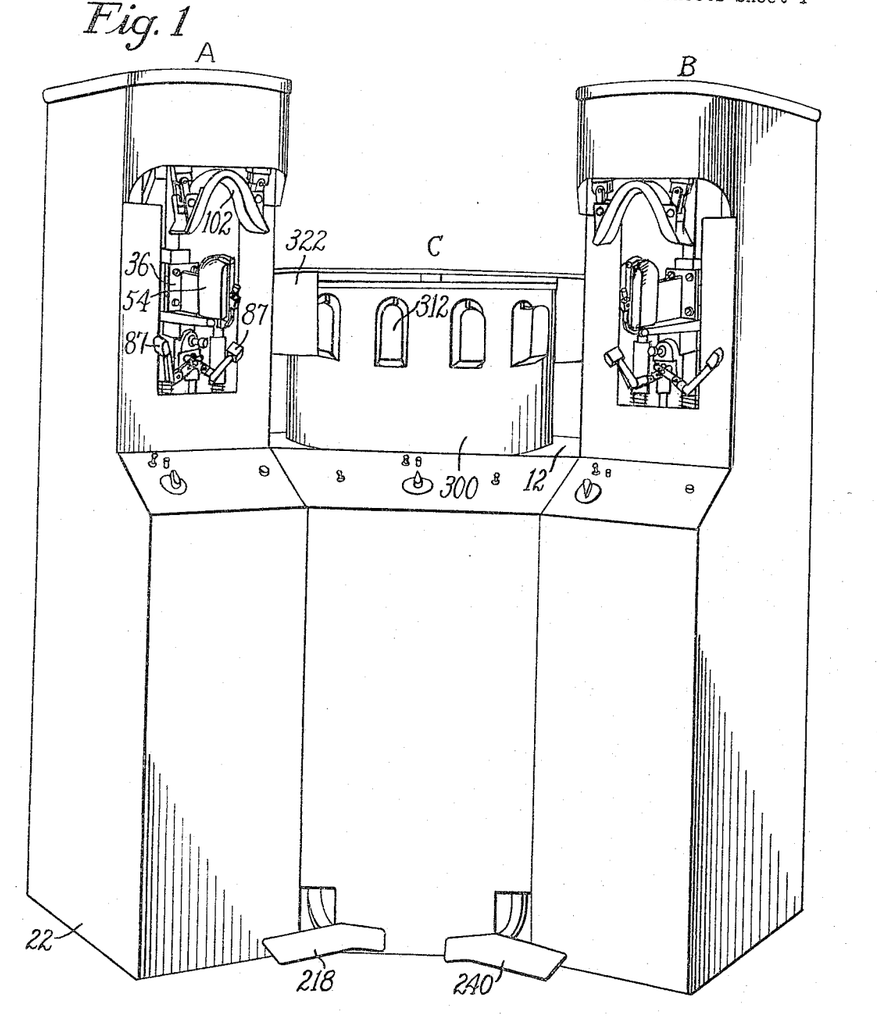
FIG. 1 is a front elevation illustrating a machine embodying the features of the present invention, said machine having a central section in which is mounted an upper conditioning unit and two wing sections diverging forwardly from the central section and each housing a back part molding unit.

The invention is illustrated in the drawings as embodied in a machine for molding the back parts of shoe uppers off the last. As shown in FIG. 1, the machine has two molding stations A and B in the two outwardly extending wings respectively and a central upper conditioning or moist heating unit upstanding on a shelf 12 in a central station C. The arrangement of the three units of the machine is such that each of them is within easy reach of an operator standing in front of the machine. The two molding units A and B are of identical construction and accordingly only the molding unit A and the upper conditioning unit C will be described in detail. It will be understood that the following description of the back part molding unit A will apply equally well to the duplicate back part molding unit B.

Figure 2:
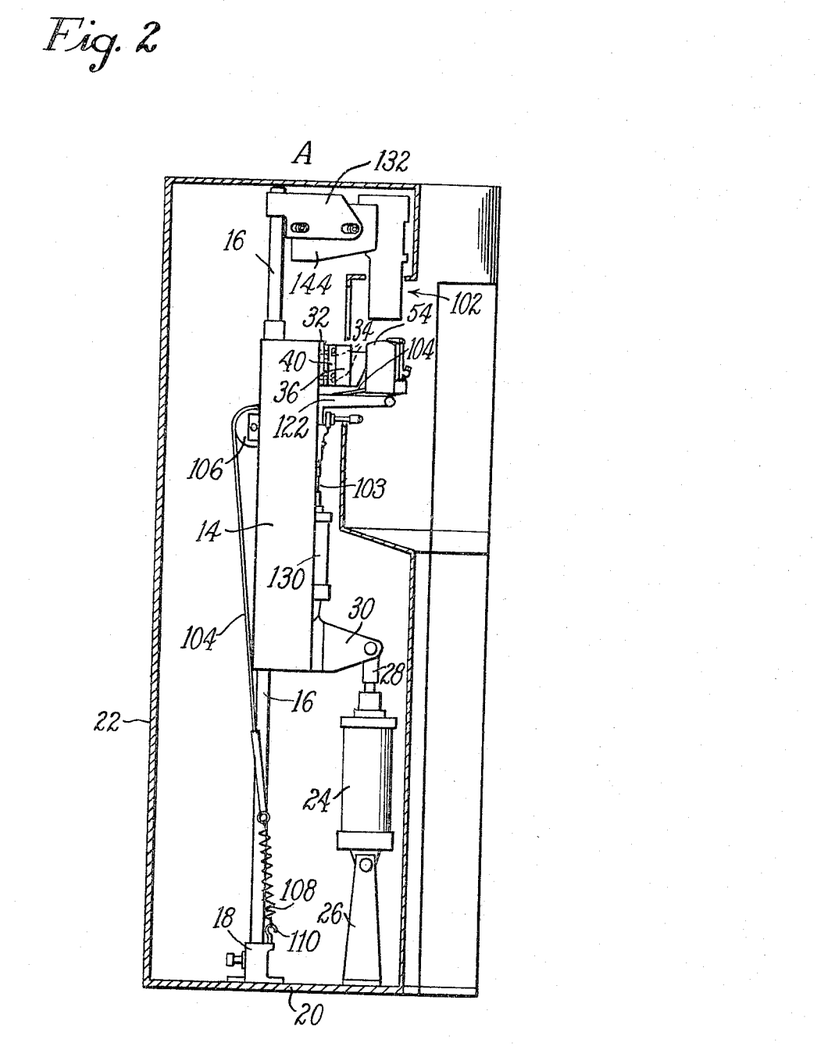
FIG. 2 is a left side elevation of the left wing section with the frame shown in section.
Figure 3:
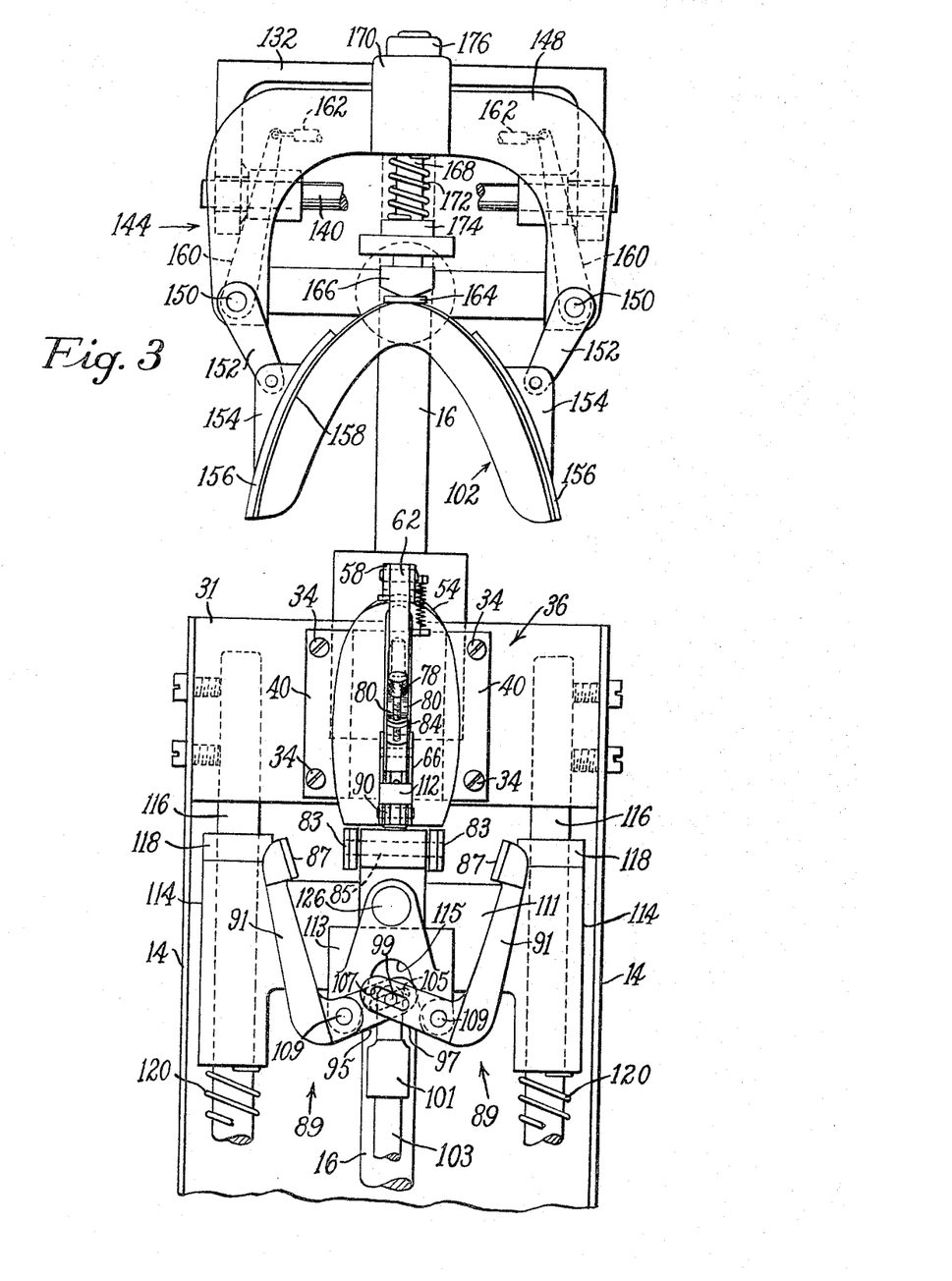
FIG. 3 is an enlarged view in front elevation illustrating certain operating instrumentalities shown generally in FIG. 2.
Figure 4:
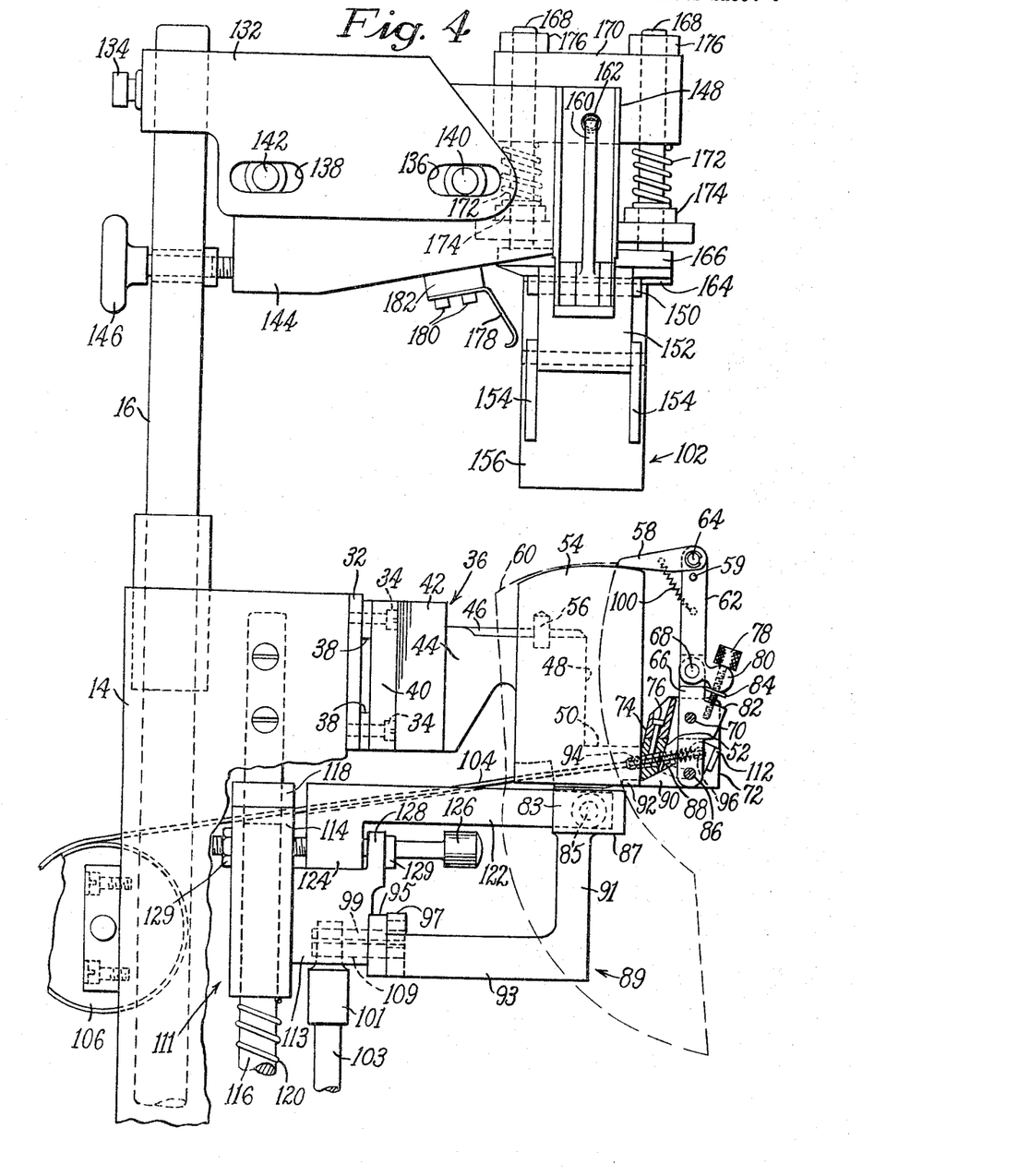
FIG. 4 is an enlarged view in side elevation illustrating the operating instrumentalities shown in FIG. 3.

Referring to FIGS. 2 and 3, the back part molding unit A in the left wing of the machine is provided with a work support in the form of a jack 14 of channel construction mounted for sliding movement endwise of a vertical shaft 16 fixed at its lower end in a standard 18 secured to the base 20 of the frame section 22. For moving the jack 14 up and down upon the shaft 16 a pneumatic piston and cylinder assembly 24 is pivotally mounted at the upper extremity of a standard 26 secured to the base 20. A piston rod 28 projecting upwardly from the cylinder 24 is pivotally mounted between a pair of lugs 30 projecting forwardly from the lower portion of the jack 14. Fixed to a crosshead 31 (FIG. 3) at the upper extremity of the jack is a vertical platen 32 to which there is secured by screws 34 a forwardly extending head 36 which is spaced from the platen 32 by suitable spacer members 38 (FIG. 4). The screws 34 extend through flanges 40 projecting in opposite directions from a main or body portion 42 of the head 36. Extending forwardly from said body portion is a vertical tongue 44 the upper edge face of which is rounded for the greater part of its length as indicated at 46. The upper portion of the tongue terminates in a vertical edge face 48 which at its lower extremity forms a right angle with a horizontal edge face 50 forming the upper surface of a forward extension terminating in an undercut edge face 52. The tongue 44 is designed to mount any one of a plurality of heel forms such for example as the heel form 54 illustrated in FIG. 4. The heel form is slotted to engage the tongue 44 and is held against horizontal movement thereon by a pin 56 fixed in the tongue and projecting upwardly from its rounded edge face 46 into a socket formed in the heel form at the base of the slot.

For gaging the position of the back line portion of a shoe upper heightwise thereof on the upper extremity of the heel form 54 there is provided a gage member 58 arranged to bear against the upper extremity of the heel form and to abut a shoe upper thereon at the junction of the top line and the back line. A shoe upper 60 is indicated by broken lines in FIG. 4 in abutting relation to the gage member 58. At its right end portion, as seen in FIG. 4, the gage member 58 is bifurcated to receive the upper end portion of an arm 62 on which it is pivoted on a pin 64. At its lower extremity the arm 62 is received in the bifurcated upper portion of an arm 66 and pivoted therein on a cross pin 68. The arm 66 is pivotally mounted at its central portion on a cross pin 70 mounted in a yoke 72 secured to the forward extremity of the tongue 44 by screws extending through the cross portion 74 of the yoke, one of said screws being identified in FIG. 4 by the numeral 76. In order to adjust the position of the gage member 58 heightwise of a shoe upper on the heel form 54, a screw 78 is positioned between two parallel discoidal forward extensions 80 of the arm 62 and threaded into an angular tapped socket in a forward extension 82 of the lower arm 66. The extensions 80 are held against movement endwise of the adjusting screws 78 by engagement of their upper portions with the head of the screw and by the engagement of their lower portions with a flange 84.

It will be understood that the gage member 58 may be adjusted heightwise of a shoe upper on the heel form 54 by turning the screw 78 and thereby effecting angular movement of the upper arm 62 relatively to the lower arm 66. The operative position of the gage member, as shown in FIG. 4, is determined by the engagement of a cross pin 86 mounted in the lower end portion of the arm 66 with the forward end wall of each of two arcuate slots formed in the yoke 72, one of said slots being identified in FIG. 4 by the numeral 88. The gage member is positively held against movement from its gaging position by a latch member 90 which is received within the bifurcated lower portion of the arm 66 and pivotally mounted on the cross pin 86. The illustrated latch member has a rearwardly extending finger 92 constructed and arranged to be seated in a rabbet in the heel form 54, as shown in FIG. 4. The latch member is normally held in its latching position illustrated in FIG. 4 by a compression spring 94 the forward portion of which is anchored to a cross pin 96 mounted in the bifurcated forward portion of the latch member and the rear end portion of which is seated in a socket in the heel form 54. The spring 94 urges the latch member in a clockwise direction as seen in FIG. 4 thereby to hold the latch member in its operative position. The spring 94 also operates, as hereinafter described, to swing the gage assembly in a counterclockwise direction as seen in FIG. 4 to bring it into its operative position. The gage member 58 is yieldingly urged downwardly against the heel form 54 by a spring 100 one end of which is anchored to the gage member and the other end to the arm 62. During the upward movement of the jack the gage member 58 is moved forwardly away from the heel form 54 to provide clearance for the operation of a heel band 102. To this end a line, in the form of a cord or wire 104, is anchored to the cross pin 96 and extends rearwardly therefrom through the coils of the spring 94 and through a suitable opening in the lower portion of the heel form 54. The cord extends around a pulley 106 carried by the jack 14 and has its lower end attached to a spring 108 (FIG. 2) anchored to a hook 110 projecting upwardly from the standard 18. Upward movement of the jack causes the spring 108 to be tensioned thus causing the release of the latch 90. The releasing movement of the latch is arrested by the engagement of a cross bar 112 carried by the latch with the forward edge faces of the bifurcated lower portion of the arm 66. Continued upward movement of the jack after the releasing movement of the latch 90 has terminated causes the gage assembly to swing in a clockwise direction as seen in FIG. 4 into its retracted position which is determined by the engagement of the arm 66 with the cross portion 74 of the yoke 72. When the arm 66 is in this position the gage member 58 is clear of the heel form and is located by a pin 59 mounted in the arm 62.

For tensioning an upper on the heel form 54 longitudinally from the shank or breast line portion heelwardly to the back line there is provided in the back part molding unit A gripping means illustrated in FIG. 3 and comprising inner gripper members 83 herein illustrated as heads fixed to the opposite end portions of a horizontal shaft 85 freely mounted for lateral sliding movement beneath the heel form 54. Cooperating with the inner gripper members 83 are two outer gripper members 87 which are formed at the upper extremities of angular levers generally indicated at 89. As shown in FIG. 4 each of these levers comprises an upstanding forward portion 91, a horizontal portion 93 (FIG. 4) extending rearwardly from the portion 91, and, as shown in FIG. 3, arms 95 and 97 extending inwardly from the rear portions of the arms 93 and providing a halved joint through which a pin 99 (FIG. 4) extends forwardly from a head 101 at the upper extremity of a piston rod 103 through slots 105 and 107 (FIG. 3) formed respectively in the arms 95 and 97. The levers 89 are pivotally mounted on pins 109 extending forwardly from a carrier member 111 through bores formed in the arms 95 and 97. As shown in FIG. 4 the pins 109 are mounted in a forward extension 113 of the carrier 111. Referring to FIG. 3 the forward extension of the carrier 111 is arched at 115 to receive the upper extremity of the head 101 on the piston rod 103. The carrier 111 is provided at opposite lateral extremities thereof with vertical barrel sections 114 which are slidably mounted on vertical shafts 116 fixed in and depending from the crosshead 31 of the jack 14. The carrier is normally positioned as shown in FIG. 3 with the upper extremities of the barrel sections 114 urged upwardly against fixed collars 118 by compression springs 120 surrounding the shafts 116 and positioned beneath the barrel sections 114. Referring to FIG. 4 the shaft 85 which mounts the inner gripper members 83 is mounted for endwise sliding movement in a bore in the forward portion of an arm 122 having at its rear end a downwardly extending leg 124 slidably mounted on the upper surface of the extension 113. For adjusting the arm 122 lengthwise thereof forwardly and rearwardly relatively to the levers 89 a thumb screw 126 is journaled in bearings in ears projecting upwardly from the carrier 111 and its extension 113, the latter ear being identified in FIG. 4 by the numeral 128. The thumb screw 126 has threaded engagement in a tapped bore in the leg 124 and is held against endwise movement by collars 129. For imparting downward movement to the gripper assembly thereby to impart lengthwise tension to the rear portion of an upper on the heel form a piston and cylinder assembly 130 (FIG. 2) is mounted in the lower portion of the jack 14 and has the piston rod 103 hereinbefore referred to extending upwardly therefrom.

For shaping the heel end portion of a shoe upper mounted on the heel form 36, the heel band 102 is carried by an assembly now to be described. A frame 132 is secured to the upper portion of the shaft 16 by a clamping screw 134 (FIG. 4). The side walls of the frame are provided with horizontal slots 136 and 138 within which are received opposite end portions of two transverse shafts 140 and 142 from which depends a carriage 144. For adjusting the carriage 144 forwardly and rearwardly within the frame 132 an adjusting screw 146 is journaled in a bearing in the shaft 16 and has threaded engagement in the rear portion of the carriage 144. Referring to FIG. 3 the carriage terminates at its forward extremity in a yoke structure 148 the lower ends of which are bored horizontally to provide bearings for two shafts 150. Fixed to said shafts are two arms 152 which converge downwardly and are pivotally connected at their lower ends to ears 154 projecting outwardly form curved plates 156 which are bonded to a flexible steel band 158 to which is attached the heel band 102. The illustrated heel band is a thick rubber member which is preferably molded to conform at least generally to the contour of the heel form 36. Referring to FIG. 4 the upper portion of each arm 152 is bifurcated to embrace the lower portion of an arm 160 which like the arm 152 is secured to the shaft 150. Referring to FIG. 3 the two arms converge upwardly and are interconnected by a tension spring 162. The spring 162 constantly urges the arms 152 outwardly away from each other and thus maintains the heel band in its outspread position shown in FIG. 3.

For causing the application of upper shaping pressure to the back line engaging portion of the heel band prior to the full closing of the heel band upon the upper on the heel form mechanism now to be described is provided. The upper or central portion of the flexible steel band 158 is reinforced by a rigid steel plate 164 extending from front to back of the heel band assembly. Concomitantly with the upward thrust of the heel form into the heel band downward pressure is applied to the plate 164 by means including a cross head or bridge member 166 extending from front to back and overlying the plate 164. The cross head is secured to the lower end portions of two vertical shafts 168 (FIG. 4) slidably mounted in bearings in a superstructure 170 formed integrally with the yoke 148 and extending forwardly and rearwardly therefrom. For applying downward pressure to the bridge member 166 each shaft 168 is surrounded by a spring 172 which is confined between the bottom surface of the superstructure 170 and a nut 174 on a threaded lower portion of the shaft 168. When the machine is at rest the pressure assembly above described is maintained in its position illustrated in FIG. 3 by the engagement of nuts 176 on threaded upper portions of the shafts 168, respectively, with the upper surface of the superstructure 170. Thus it will be seen that when the heel form 36 is thrust upwardly by the upward movement of the jack 14 the upper on the heel form makes contact initially at the back line area of the heel band 102, forcing the band upwardly against the pressure of the springs 172 and concomitantly causing the arms 152 to advance the side portions of the heel band toward each other and to cause them to apply upper shaping pressure to the opposite sides of the heel portion of the upper.

During the upward movement of the heel form the lasting margin at the back line portion of the upper engages a spring finger 178 which causes it to be wiped downwardly against the base of the heel form. Referring to FIG. 4 the finger 178 is provided with a horizontal shank portion which is slotted to receive headed screws 180 which clamp the finger against the bottom surface of a boss 182 extending downwardly from the carriage 144.

If desired, the shaping of the heel portion of the upper may be promoted by the application of heat to the heel form 36. To this end the illustrated heel form is equipped with suitable electrical cartridges (not shown).

Figure 5:
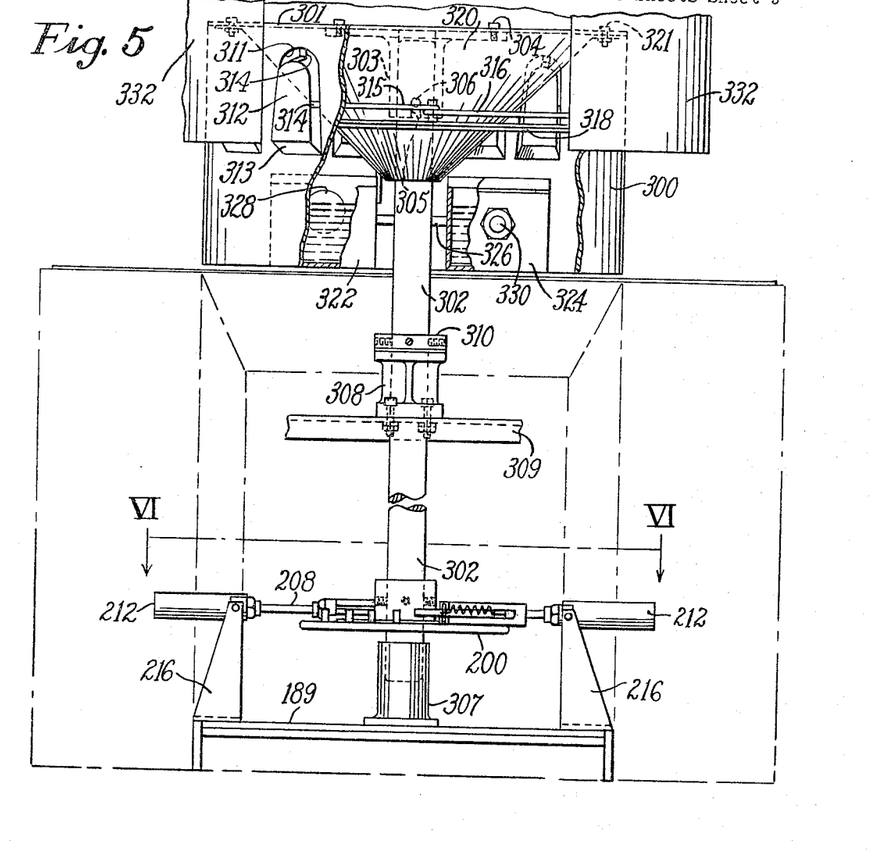
FIG. 5 is a front elevation illustrating the upper conditioning unit, certain portions being broken away to disclose the interior structure.

In station C of the illustrated machine there is provided means for applying heat and moisture to the heel end portion of a shoe upper preparatory to the upper shaping operation. Referring to FIG. 5, a turret in the form of a cylinder 300 having a head 301 but being open at the base is positioned above the shelf 12. For suspending the turret at the upper extremity of a vertical shaft 302, a hub 303 having an outwardly extending flange is secured to the head 301 by headed screws, one of which is illustrated in FIG. 5 and identified by the numeral 304. The hub has formed therein a vertical slot 305 which receives a pin 306 projecting radially from the shaft 302. At its lower extremity the shaft is journaled in a bearing provided by a standard 307 secured to the platform 189 and between its ends the shaft is journaled in a bearing member 308 secured to a frame member 309. The shaft is positioned vertically by the engagement of a collar 310 secured thereto with a fiber washer on the upper edge face of the bearing member 308. For supporting shoe uppers with their heel ends uppermost, twelve supports are uniformly spaced about the upper portion of the cylinder 300, each support registering with an aperture 311 formed in the cylinder. Each support is in the form of a vertical plate 312 having a curved upper extremity and having at its lower extremity a horizontal extension 313 fixed to the cylinder at the base of the aperture. Three legs 314 connect the plate 312 to the cylinder at the edge of the aperture. Secured to a suitable support (not shown) are two arcuate heating elements 315 and 316 concentrically arranged about the shaft 302. Positioned directly beneath the heating elements is an annular reflector plate 318 which reflects upwardly heat radiated downwardly by the heating elements. A downwardly directed frusto-conical reflector member 320 is arranged to surround the shaft 302 and is so positioned vertically that heat radiated upwardly by the heating elements 315 and 316 and by the reflector plate 318 is reflected through the apertures 311 and against shoe uppers mounted on the upper supporting plates 312. As shown in FIG. 5 the reflector member 320 has an outwardly extending flange whereby the reflector member is secured to the head 301 of the cylinder by bolts, one of which is illustrated in FIG. 5, and identified by the numeral 321. Moisture is provided within the turret by two tanks 322 and 324 arranged at opposite sides of the shaft 302 and interconnected by a horizontal pipe 326. The tank 322 has a ball cock 328 which controls the depth of water in the tank and through the pipe 326 controls the depth of water in the tank 324. The tank 324 is provided with a heating element 330 which heats the water sufficiently to cause the air inside the cylinder 300 to be humidified. The cylinder 300 is partially surrounded by a fixed shroud 332 which is broken away at the front to permit loading and unloading of uppers on the plates 312. For effecting intermittent stepwise rotation of the turret 300 a ratchet wheel 200 is secured to the lower portion of the shaft 312 below the turret. The illustrated ratchet wheel is provided with twelve upstanding pins which serve the function of ratchet teeth, one of said pins being identified in FIG. 6 by the numeral 202. The pins are uniformly spaced about the margin of the ratchet wheel and are acted upon by two pawls 204 arranged at diametrically opposite positions relatively to the ratchet wheel. The pawls are so operated that one pawl remains stationary in contact with one of the pins to hold the ratchet wheel against counter-clockwise movement while the other pawl is first advanced to rotate the ratchet wheel 30° in a clockwise direction and then retracted to bring it into engagement with the next adjacent pin on the ratchet wheel. Each pawl is pivotally mounted in a suitable carrier 206 secured to the end portion of a piston rod 208 and is urged into pin engaging position by a spring 210 anchored at one end to a tail portion of the pawl 204 and at its opposite end to an angular extension of the carrier 206. The piston rod operates in a cylinder 212 and is advanced by pneumatic pressure in the base of the cylinder 212 and retracted by a spring 214 in the head of the cylinder. As shown in FIG. 5 each of the two cylinders 212 is pivotally mounted in the upper portion of a yoke 216 secured to a platform 189. The pawls 204 operate alternately, one holding the ratchet wheel against counter-clockwise movement while the other operates to advance the ratchet wheel 30° in a clockwise direction and then retracts to its starting position.

In the operation of the illustrated machine uppers arranged in pairs are mounted on the heel forms 312 on the turret in station C. As a matter of convenience, left uppers are molded in station A and right uppers are molded in station B. After a period of time sufficient to condition the uppers the operator selects a left upper from the turret and replaces it by another left upper to be conditioned. The selected upper is placed upon the heel form 54 in station A and that portion of the top line at the junction of the back seam is brought into engagement with the gage member 58 thereby to locate the heel portion of the upper heightwise thereof upon the heel form. Opposite side portions of the upper are then interposed between the gripper members 83 and 87. The operator then depresses a treadle 218 in station A against the tension of a treadle spring (not shown) thereby to actuate a valve 220 (FIG. 7) which causes compressed air from a suitable source to flow through said valve to the top of the cylinder 130 thus causing the piston rod 103 to be drawn downwardly. Downward movement of the piston rod first closes the gripper members 83 and 87 upon the upper and then moves the gripper assembly downwardly against the pressure of the springs 120 to apply downward tension to the rear portion of the upper.

Figure 7:
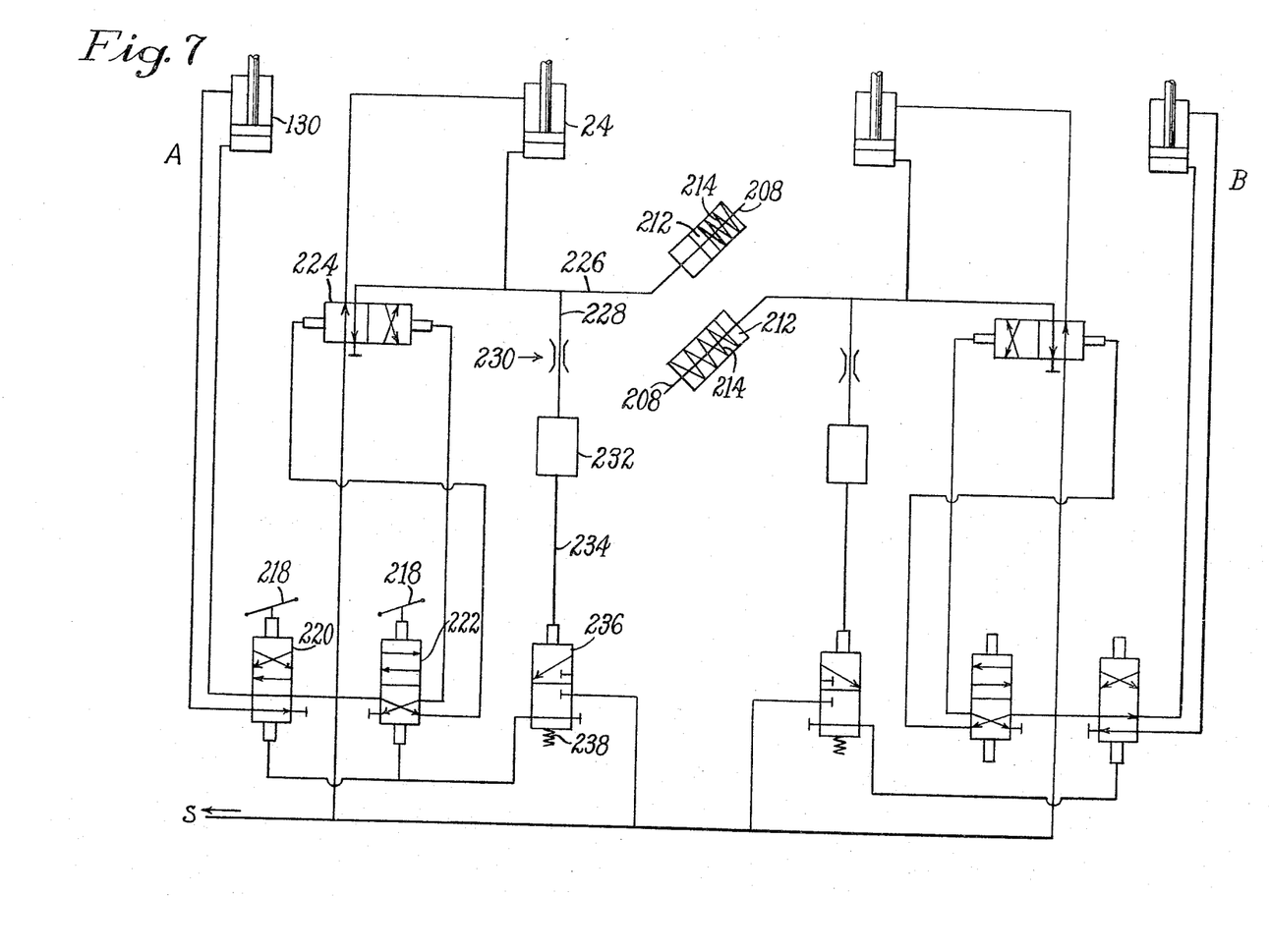
FIG. 7 is a chart of the pneumatic operations of the machine.

The operator then observes the position of the upper on the heel form. If the position of the upper requires correction the operator releases the treadle to permit the gripper jaws to open and adjusts the position of the upper on the heel form as required and again initiates the operation of the machine. If after the application of tension to the upper as above described the position of the upper on the heel form appears to be correct the operator further depresses the treadle 218 to operate a valve 222. The operation of the valve 222 causes a pilot value 224 to move to the left as seen in FIG. 7, air from the left side being exhausted through the valve 222. The operation of the valve 224 opens a pressure line to the bottom of the cylinder 24 thus raising the jack 14 and causing the upper on the heel form to be thrust into the embrace of the heel band 102. Air from the upper portion of the cylinder 24 is exhausted through the valve 224.

Figure 6:
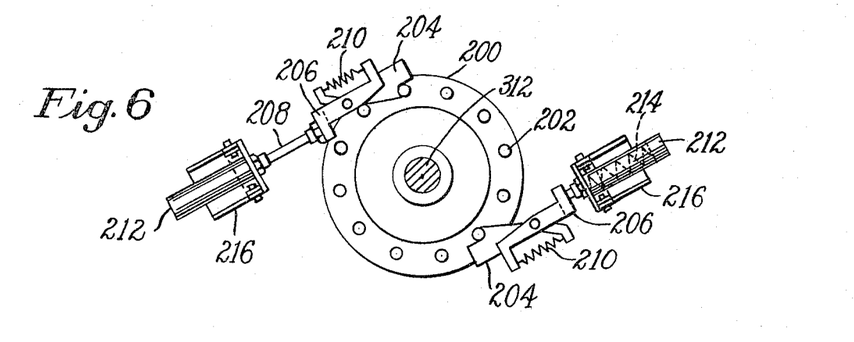
FIG. 6 is a section taken on the line VI—VI of FIG. 5.

Concomitantly with the upward movement of the jack, compressed air passes through a conduit 226 to one of the two cylinders 212 illustrated in FIG. 6 thereby indexing the turret 30° in a clockwise direction as hereinbefore described.

Compressed air also flows through a variable restriction 230 to a charge cylinder 232 which is connected by a conduit 234 to a spring-return pilot valve 236. When pressure in the charge cylinder 232 has increased sufficiently to overcome the spring 238 the valve 236 is operated to admit compressed air to the pilot end of the valve 222 thus returning said valve to its initial position illustrated in FIG. 7, assuming that the operator has released the treadle 218. With the valve 222 in its initial position the right end portion of the valve 224 is open to exhaust and the left end is open to pressure thus causing the valve to be moved to the right into its position illustrated in FIG. 7 thus opening the lower portion of the cylinder 24 to exhaust and the upper portion to pressure and thus causing downward movement of the jack 14. Concomitantly with the operation of the valve 222, compressed air acts on the pilot end of the valve 220 to return it to its initial position illustrated in FIG. 7 thus opening the lower portion of the cylinder 130 to pressure and the upper portion to exhaust. The resultant upward movement of the piston causes the gripper jaws 83 and 87 to be returned to their upper position illustrated in FIG. 3 thus permitting the upper, the heel end of which is now molded, to be removed from the heel form 54. When the pneumatic system is not pressurized the valves 220 and 222 are maintained in their respective elevated positons illustrated in FIG. 7 by the spring which elevates the treadle 218.

The variable restriction 230 is adjustable to vary the duration of the period during which the heel portion of the upper is under the pressure of the heel band 102. The length of the period of pressure is governed largely by the type of heel stiffener incorporated in the upper. A fiber board stiffener, for example, requires a longer period of pressure than stiffener of woven fabric impregnated with thermoplastic composition.

While a shoe upper is under pressure in station A the operator takes the foremost upper from the turret 300, which in this case is a right foot upper and places it upon the heel form in the molding unit B and depresses a treadle 240 to initiate the operation of said molding unit. The cycle of operations in molding unit B, which is similar to the unit A, will be understood from the foregoing description.

Having thus described our invention, what we claim as new and desire to secure by Letters Patent of the United States is:

1. In an upper shaping machine, a jack mounted for movement between a loading station and an upper shaping station, a form mounted on the jack for supporting a shoe upper, a band mounted in the upper shaping station and arranged to shape a shoe upper upon the form, means for advancing the jack from the loading station to the upper shaping station, means for applying heat and moisture to a shoe upper to condition for the shaping operation, said means including a turret mounted for stepwise rotation to advance a shoe upper thereon to and from a loading station, and means operated concomitantly with the advancement of the jack from the loading station to the upper shaping station for causing stepwise rotation of the turret.

2. In an upper shaping machine, a shoe supporting jack, means mounting said jack for movement between a loading station and an upper shaping station, a head projecting forwardly from the jack and arranged to support any one of a plurality of forms, a pair of gripper jaws for tensioning a shoe upper mounted on a form supported on the head, carrier on which the jaws are mounted, means on the jack for mounting the carrier for movement lengthwise of an upper on the form, an actuator mounted on the jack and means whereby the actuator acts first to close the gripper jaws on the upper and thereafter to move the carrier in a direction to cause the gripper jaws to tension the upper.

3. In an upper shaping machine, a shoe supporting jack comprising a first carrier, a head mounted on the first carrier, a platen projecting from the head and arranged to support a slotted shoe form, a pair of gripper jaws for tensioning a shoe upper mounted on the form, a second carrier on which the jaws are mounted, means on the jack for mounting the second carrier for movement lengthwise of a shoe upper on the form, an actuator mounted on the first carrier and means whereby the actuator operates first to close the gripper jaws on the upper and thereafter to move the second carrier in a direction to cause the gripper jaws to tension the upper.

4. In an upper shaping machine, a jack comprising a first carrier, a head projecting from the first carrier, a platen projecting from the head and arranged to provide a support for a slotted upper-shaping form, means mounting the jack for movement between a loading station and an upper shaping station, a pair of grippers for tensioning a shoe upper on the form, a second carrier on which the grippers are mounted, means on the first carrier for mounting the second carrier for movement lengthwise of a shoe upper on the form, an actuator mounted on the first carrier, connections whereby the actuator operates first to close the gripper jaws and thereafter to move the assembly comprising the gripper jaws and the second carrier in a direction to tension the upper, a gage member carried by the jack and arranged to gage the position of the upper on the form and means operated by movement of the jack from its loading station to its upper shaping station for retracting the gage member into a position away from the shoe form.

5. In an upper shaping machine, a jack comprising a first carrier, a head projecting forwardly from the carrier, a platen projecting forwardly from the head and arranged to provide a support for a sloted heel form, a standard mounting the jack for movement between a loading station and an upper shaping station, a pair of grippers for applying toeward tension to a shoe upper mounted on the heel form, a second carrier on which the grippers are mounted, means on the first carrier for slidably mounting the second carrier for movement lengthwise of a shoe upper on the form, a piston and cylinder assembly mounted on the first carrier and connections whereby the piston operates first to close the jaws and thereafter to move the assembly comprising the gripper jaws and the second carrier in a direction to tension the upper.

6. In an upper shaping machine, a jack comprising a first carrier, a head projecting forwardly from the carrier, a platen projecting forwardly from the head and arranged to provide a support for a slotted heel form, a standard mounting the jack for movement between a loading station and an upper shaping station, a pair of grippers for applying toeward tension to a shoe upper mounted on the heel form, a second carrier on which the grippers are mounted, means on the first carrier for slidably mounting the second carrier for movement lengthwise of a shoe upper on the form, a piston and cylinder assembly mounted on the first carrier, connections whereby the piston operates first to close the jaws and thereafter to move the assembly comprising the gripper jaws and the second carrier in a direction to tension the upper, a gage member for positioning the heel portion of a shoe upper heightwise thereof on the heel form, an extension of the platen providing a mounting for the gage member and a line operated by movement of the jack from its loading station toward its upper shaping station for retracting the gage member into a position in which it is offset from the shoe form.

7. In an upper shaping machine, a jack comprising a first carrier, a head projecting forwardly from the carrier, a platen projecting forwardly from the head and arranged to provide a support for a slotted heel form, a standard mounting the jack for movement between a loading station and an upper shaping station, a pair of grippers for applying toeward tension to a shoe upper mounted on the heel form, a second carrier on which the grippers are mounted, means on the first carrier for slidably mounting the second carrier for movement lengthwise of a shoe upper on the form, a piston and cylinder assembly mounted on the first carrier, connections whereby the piston operates first to close the jaws and thereafter to move the assembly comprising the gripper jaws and the second carrier in a direction to tension the upper, a gage member for positioning the heel portion of a shoe upper heightwise thereof on the heel form, an extension of the platen providing a mounting for the gage member, a line operated by movement of the jack from its loading station toward its upper shaping station for retracting the gage member into a position in which it is offset from the heel form, said gage member comprising a gage finger, a first arm on which the finger is pivotally mounted, a second arm on which the first arm is pivotally mounted for angular adjustment relatively thereto, means for effecting angular adjustment of the first arm relatively to the second arm and means for pivotally mounting the second arm on the extension of the platen.

8. In an upper shaping machine, a jack, a head projecting from the jack and arranged to provide a support for a heel form, a gage for positioning the heel end portion of a shoe upper heightwise thereof on the heel form, an extension of the head providing a mounting for the gage, a line operated by a movement of the jack for retracting the gage into a position in which it is disengaged from the heel form, said gage comprising a gage finger, a first arm on which the finger is pivotally mounted, a second arm on which the first arm is pivotally mounted for angular movement relatively to the second arm, means for effecting such angular movement of the first arm and means for pivotally mounting the second arm on the extension of the head.

9. In an upper shaping machine according to claim 8, a latch member carried by the second arm and arranged to retain the gage in its gaging position, means connecting said latch member to said gage retracting line whereby the line operates first to unlatch the latch member and thereafter to retract the gage member.

10. In an upper shaping machine, a jack mounted for movement between a loading station and an upper shaping station, a form mounted on the jack for supporting a shoe upper, grippers arranged to engage opposite sides of an upper on the form, said grippers comprising two inner jaws, a common mounting means for said inner jaws, a head in which the mounting means is positioned for sliding movement widthwise of an upper on the form, two outer grippper jaws mounted on the head and arranged to close against the inner gripper jaws and means for closing the jaws and moving the head in a direction to cause the grippers to tension the upper lengthwise thereof.

11. In an upper shaping machine, a jack mounted for movement between a loading station and an upper shaping station, a form mounted on the jack for supporting a shoe upper, grippers arranged to engage a shoe upper on the form at opposite sides thereof, said grippers comprising two inner jaws, a shaft mounting said jaws, a carrier in which the shaft is slidably mounted for movement widthwise of the upper, two outer jaws mounted on the carrier and arranged to grip opposite side portions of the upper against the inner jaws, means fixed in the jack and arranged to mount the carrier for movement lengthwise of the upper and means mounted in the jack for first advancing the outer jaws into gripping position and for thereafter moving the carrier thereby to cause the grippers to tension the upper lengthwise thereof.

12. In an upper shaping machine, a jack, a form mounted on the jack for supporting a shoe upper, a standard on which the jack is mounted for movement between a loading station and an upper shaping station, a band mounted in the upper shaping station, said band being effective by movement of the jack into the upper shaping station to shape a shoe upper upon the form, a carrier for the band, a fixture secured to the standard and arranged to mount the carrier for movement heightwise of a shoe upper on the form, means for effecting such movement of the carrier, and a resilient wiper element fixed to the carrier and operable during movement of the form from the loading station to the upper shaping station to perform a wiping operation at a selected area of the bottom margin of the upper.

13. In an upper shaping machine, a jack, a heel form mounted on the jack for supporting a shoe upper with its heel end uppermost, a heel band mounted in an upper shaping station of the machine, a standard on which the jack is mounted for vertical movement to advance a shoe upper on the heel form from a loading station to the upper shaping station and to thrust it into the embrace of the heel band thereby to shape the heel portion of the upper upon the form, a carrier for the heel band, a fixture secured to the standard and arranged to mount the carrier for movement generally heightwise of a shoe upper on the heel form, means for effecting such movement of the carrier, heel band supporting members mounted on the carrier and connected to the heel band at opposite sides thereof, said members being so arranged that upward movement of the heel band by the upward thrust of the heel form causes the opposite side portions of the band to be pressed against opposite sides of the heel end portion of a shoe upper on the form, means acting on the supporting members to hold the heel band outspread and a thrust member acting against the central portion of the band and yieldingly resisting upward movement of the heel band by the upward thrust of the heel form so that a shoe upper on the heel form receives local pressure by the heel band at the back line of the upper before the heel band closes to engage the opposite sides of the heel end portion of the upper.

14. Means for treating a shoe upper with heat and moisture preparatory to a operation thereon comprising a turret having a plurality of upper supporting members offset outwardly therefrom and uniformly spaced about the circumference of the turret, said turret having a plurality of apertures formed therein in registration with the upper supporting members, respectively, a fixed shroud concentric to, offset outwardly from and extending only part way around the turret, means for effecting stepwise rotation of the turret, each step corresponding to the spacing of the upper supporting members circumferentially around the turret, means for producing water vapor within the turret, means for heating the air entrapped within the turret, a first reflector for reflecting upwardly heat produced by said heating means and a second reflector for reflecting outwardly through said apertures heat reflected upwardly by the first reflector.

15. In an upper shaping machine, a jack mounted for movement between a loading station and an upper shaping station, a form mounted on the jack for supporting a shoe upper, a band operating in the upper shaping station to shape a shoe upper upon the form, means for advancing the jack from the loading station to the upper shaping station, means for treating a shoe upper with heat and moisture preparatory to the upper shaping operation, said upper treating means comprising a turret having a plurality of upper supporting plates offset outwardly therefrom and spaced apart from each other about the circumference of the turret, said turret having a plurality of openings formed therein in registration with the upper supporting plates, respectively, a fixed shroud concentric to and offset outwardly from the turret, said shroud extending only part way around the turret and affording an opening at a loading station facilitating the mounting of a shoe upper on an upper supporting plate, means rendered operative by the means for advancing the jack whereby stepwise rotation of the turret is effected, means for producing water vapor within the turret, radiant means for heating the air entrapped within the turret, a first reflector for reflecting upwardly heat radiated by said heating means and a second reflector of conical structure for reflecting outwardly through said apertures heat reflected upwardly by the first reflector.

References Cited
UNITED STATES PATENTS

| | | | |
|---|---|---|---|
| 2,266,774 | 12/1941 | Lawson | 12—54.3 |
| 2,305,689 | 12/1942 | Gross et al. | 12—54.3 |
| 2,435,582 | 2/1948 | Gulbrandsen | 12—41.5 X |
| 2,694,821 | 11/1954 | Willhauck | 12—54.3 |
| 2,719,992 | 10/1955 | Mac donald | 12—53.5 |
| 2,983,934 | 5/1961 | Bertrand | 12—54.3 |
| 3,132,362 | 5/1964 | Stapleton | 12—54.3 |
| 3,138,810 | 6/1964 | Becker | 12—54.3 X |
| 3,141,183 | 7/1964 | Ralphs | 12—8.2 |

PATRICK D. LAWSON, *Primary Examiner.*